United States Patent
Robertson

(10) Patent No.: US 9,887,963 B2
(45) Date of Patent: Feb. 6, 2018

(54) NETWORK SECURITY PROCESSING

(71) Applicant: International Business Machines Corporation, Armonk, NY (US)

(72) Inventor: Ian Robertson, Oxfordshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/903,089

(22) PCT Filed: Apr. 4, 2014

(86) PCT No.: PCT/IB2014/060428
§ 371 (c)(1),
(2) Date: Jan. 6, 2016

(87) PCT Pub. No.: WO2015/004543
PCT Pub. Date: Jan. 15, 2015

(65) Prior Publication Data
US 2016/0164840 A1   Jun. 9, 2016

(30) Foreign Application Priority Data
Jul. 9, 2013   (GB) .................................. 1312298.1

(51) Int. Cl.
G06F 7/04 (2006.01)
H04L 29/06 (2006.01)
H04L 29/08 (2006.01)

(52) U.S. Cl.
CPC .......... *H04L 63/0281* (2013.01); *H04L 63/10* (2013.01); *H04L 63/1433* (2013.01);
(Continued)

(58) Field of Classification Search
CPC . H04L 63/0281; H04L 63/10; H04L 63/1433; H04L 63/1408
(Continued)

(56) References Cited

U.S. PATENT DOCUMENTS 7,237,265 B2   6/2007   Reshef et al.
7,472,421 B2   12/2008   Cummins
(Continued)

FOREIGN PATENT DOCUMENTS

| CN | 101017525 | 8/2007 |
| CN | 101571813 | 11/2009 |

(Continued)

OTHER PUBLICATIONS

Kalarani et al., "Improving the efficiency of retrieved result through transparent proxy cache server," 2013 Fourth International Conference on Computing, Communications and Networking Technologies (ICCCNT) Year: 2013 pp. 1-8.*

(Continued)

*Primary Examiner* — Roderick Tolentino
(74) *Attorney, Agent, or Firm* — Schmeiser, Olsen & Watts; John Pivnichny

(57) ABSTRACT

A method, and associated system, for security processing of a request for a resource in a network security system. The request for the resource is received from a client device. A duplicate of the received request is created. The received request and its duplicate are forwarded to a first proxy server and a second proxy server, respectively. A first output including the received request, and a second output including the duplicate of the received request, are received from first proxy server and the second proxy server, respectively. A determination is made of whether the first output and the second output differ; if not the received request or the duplicate of the received request is transmitted to a web server for satisfying the request; if so a first alarm is generated and transmission to the web server of the received request and the duplicate of the received request is blocked.

20 Claims, 8 Drawing Sheets

(52) U.S. Cl.
CPC .......... *H04L 63/1408* (2013.01); *H04L 67/02* (2013.01); *H04L 67/28* (2013.01)

(58) Field of Classification Search
USPC ...................................................... 726/26–30
See application file for complete search history.

(56) References Cited

U.S. PATENT DOCUMENTS

| | | | |
|---|---|---|---|
| 7,757,287 B2 | 7/2010 | Gassoway | |
| 8,286,239 B1 | 10/2012 | Sutton | |
| 9,203,931 B1* | 12/2015 | Ngo .................. | H04L 67/02 |
| 2004/0181687 A1* | 9/2004 | Nachenberg .......... | G06F 21/567 |
| | | | 726/30 |
| 2006/0195687 A1* | 8/2006 | Klein .................. | H04L 63/0428 |
| | | | 713/150 |
| 2008/0133761 A1* | 6/2008 | Polk .................... | H04L 63/0428 |
| | | | 709/228 |
| 2008/0282338 A1 | 11/2008 | Beer | |
| 2009/0228549 A1* | 9/2009 | Chick ................. | G06F 17/3089 |
| | | | 709/203 |
| 2012/0096565 A1* | 4/2012 | Ou ..................... | H04L 41/0806 |
| | | | 726/26 |
| 2012/0117649 A1 | 5/2012 | Holloway et al. | |
| 2013/0019314 A1 | 1/2013 | Ji et al. | |
| 2013/0086679 A1* | 4/2013 | Beiter .................... | H04L 63/08 |
| | | | 726/22 |
| 2013/0232251 A1* | 9/2013 | Pauley ................. | H04L 63/306 |
| | | | 709/224 |
| 2016/0119903 A1* | 4/2016 | Skog .................. | H04L 65/4084 |
| | | | 370/329 |

FOREIGN PATENT DOCUMENTS

| | | |
|---|---|---|
| CN | 101655895 | 2/2010 |
| CN | 101877725 | 11/2010 |
| CN | 103346904 | 10/2013 |
| EP | 1853021 | 7/2007 |
| JP | 2003067269 | 3/2003 |
| WO | WO2015004543 | 1/2015 |

OTHER PUBLICATIONS

Gazdar et al., "A distributed cooperative detection scheme for SPIT attacks in SIP based systems," 2012 Third International Conference on The Network of the Future (NOF) Year: 2012 pp. 1-5.*
Abhishek Singh, Method and Process of Applying Patches to the System, Ip.com No. 000210305D, Aug. 27, 2011, 10 pages.
Tracy et al., Guidelines on Securing Public Web Services, Recommendations of the National Institute of Standards and Technology, Special Publication 8-00-44, Version 2, Sep. 2007, 142 pages.
Jeff Jarmoc, SSL/TLS Interception Proxies and Transitive Trust, DELL, SecureWorks, Mar. 14, 2012, 21 pages.
OA Date: Jul. 4, 2017, 2 pages.
Foreign Office Action dated Jul. 4, 2017, PN 153956, 5 pages.

* cited by examiner

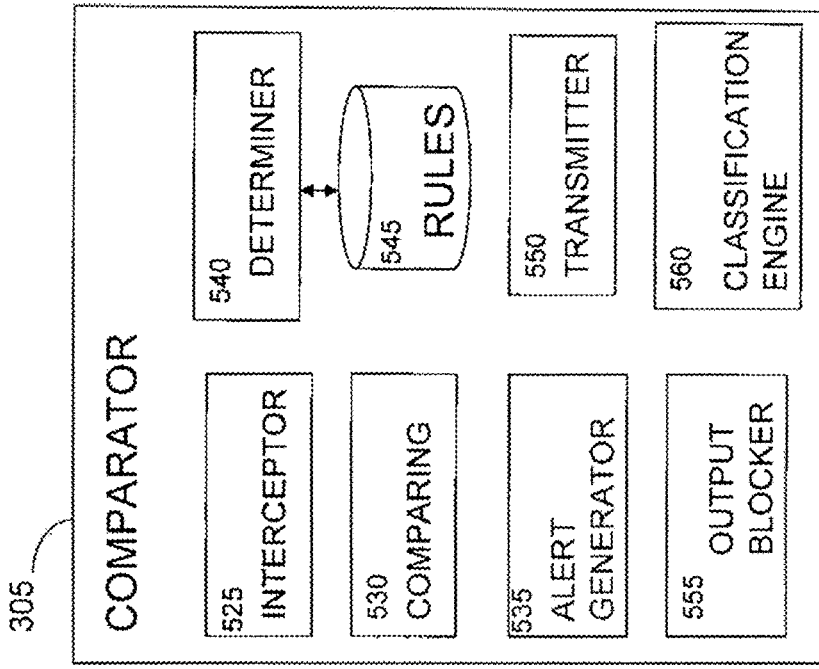
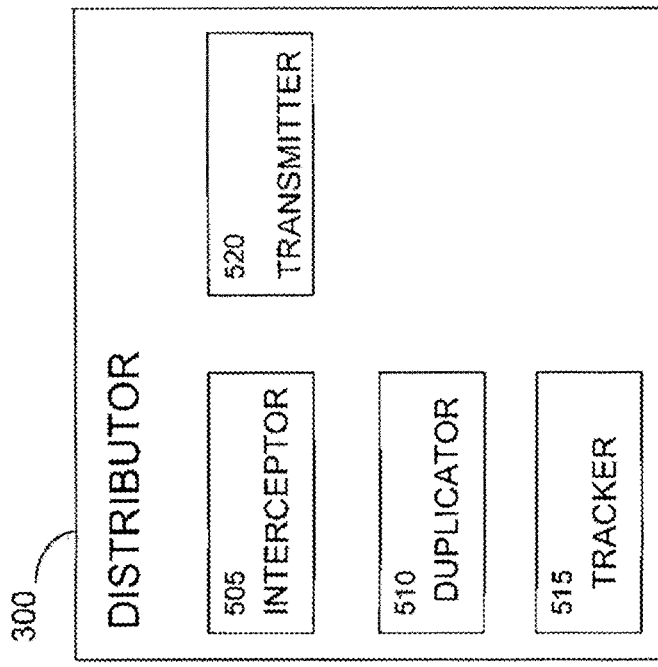

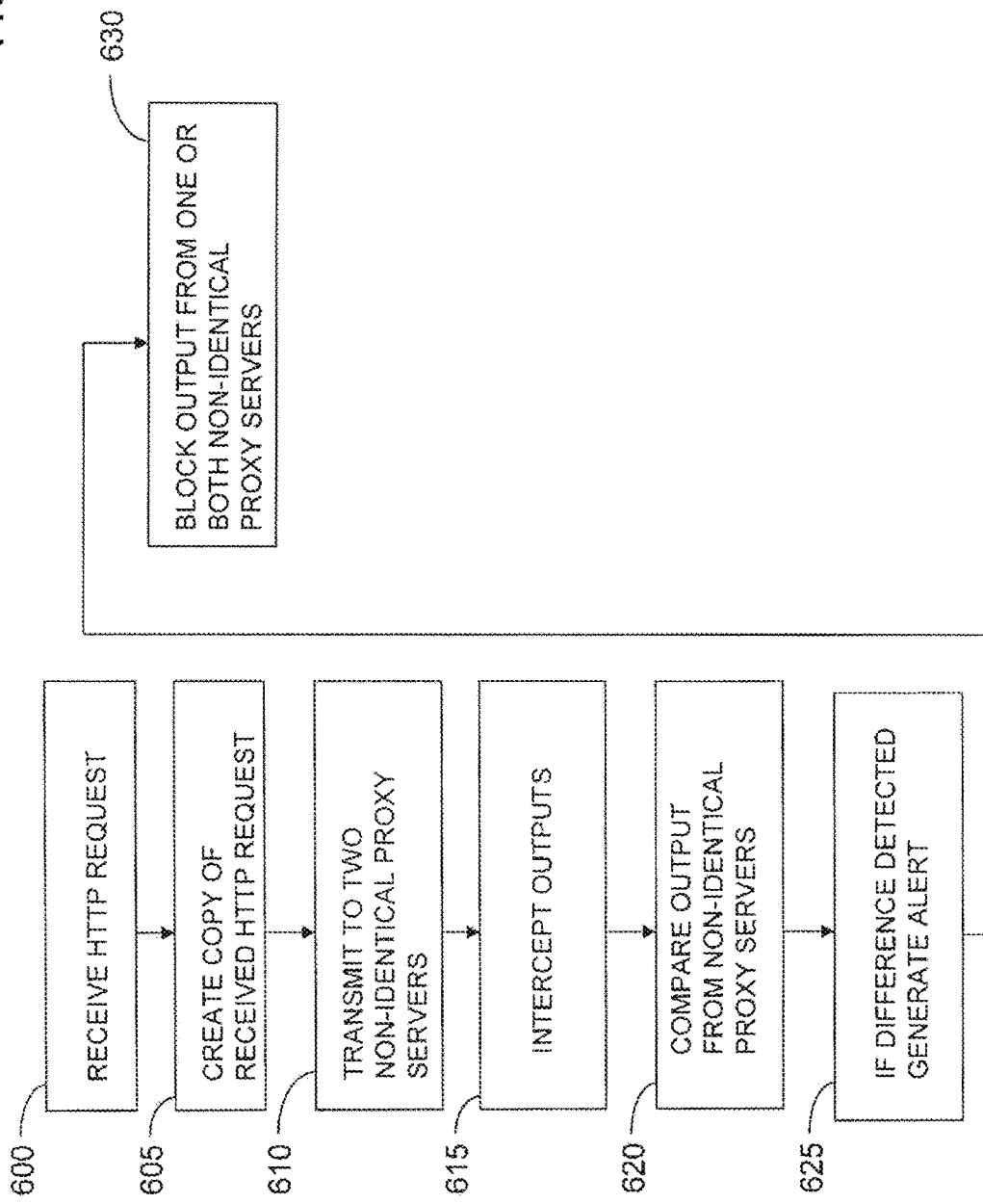

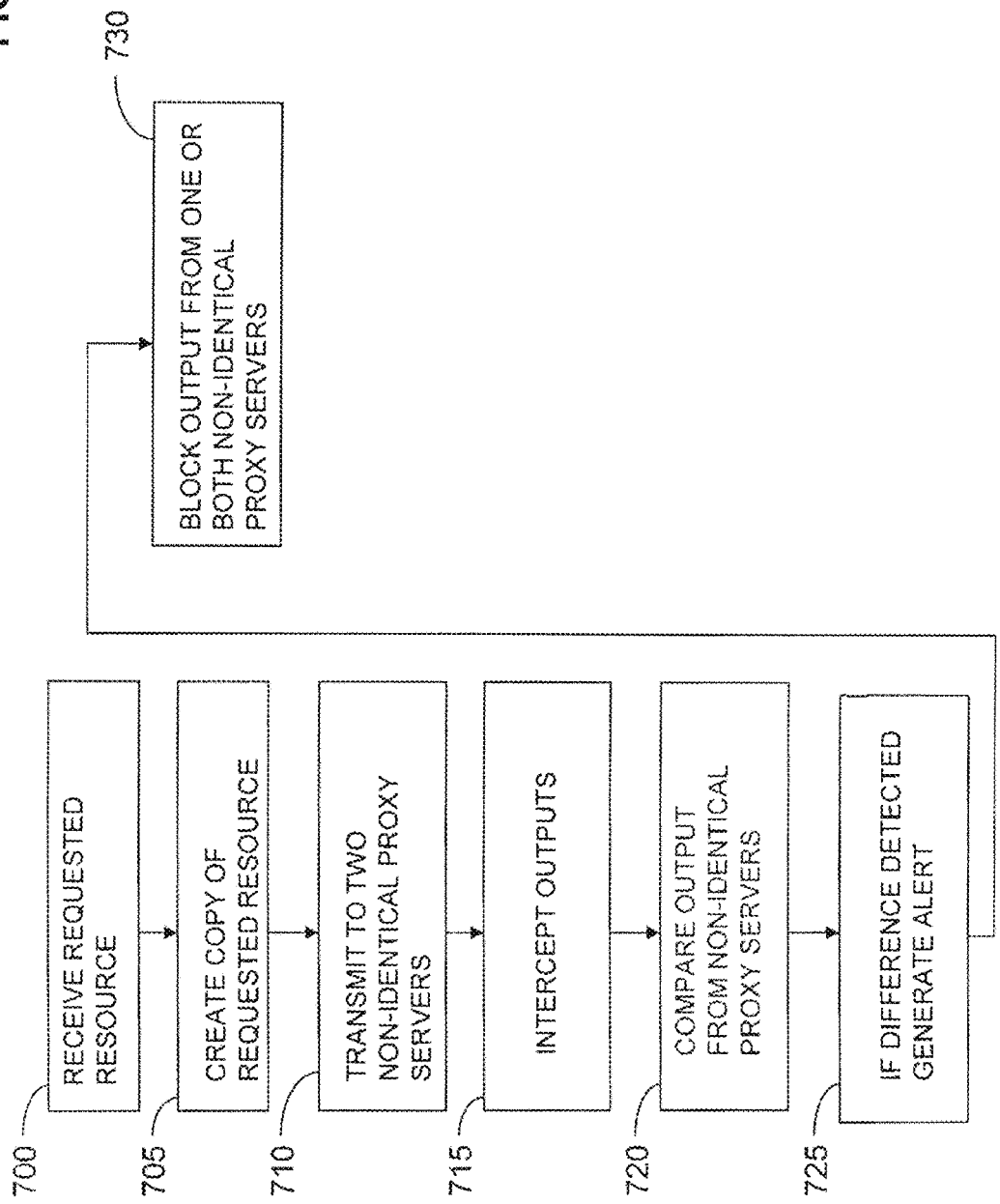

NETWORK SECURITY PROCESSING

FIELD OF THE INVENTION

The invention relates to the field of network security and in particular, the present invention relates to a system, method and a computer program for detecting a security vulnerability in a data processing network.

BACKGROUND OF THE INVENTION

A web proxy server is a server that acts as an intermediary for requests from client devices requesting resources from servers in a network. A client device typically sends a request for a resource over the network and begins by connecting to a web proxy server. The web proxy server evaluates the request, performs a number of functions and fetches the requested resource and sends it back to the requesting client. A web proxy server may perform a number of functions, for example, enabling client devices downstream of the proxy server to maintain anonymity, speeding up access to resources using techniques such as caching for preventing download of the same content multiple times, auditing of access to internet resources, scanning of transmitted content for malware before delivery to requesting clients and scanning of outbound content for data loss prevention and other access and management tasks.

Proxy servers, in particular web proxy servers are vulnerable to attack. Often attackers look for vulnerabilities in the design and the source code of components that perform some of the functions already mentioned. Vulnerabilities can be exploited to alter the behaviour of the software components and potentially threaten the confidentiality, integrity and/or availability of data within the proxy server itself or a larger network system that the proxy server is part of.

Typically this type of vulnerability exploitation attack is mitigated by using one or more specialist components to protect the web proxy server. These components can include firewalls, intrusion detection systems, web application firewalls and virus scanners. Typical vulnerabilities in web proxy servers allow an attacker to send carefully crafted messages to a component which can result in an attacker being able to take control of the web proxy server and use the web proxy server as a "launch pad" for attacks on "downstream" components of the network system. The impact of such attacks can be to degrade the confidentiality, integrity or availability of information within the overall system.

Suppliers of web proxy software make every effort to avoid introducing vulnerabilities into their products and typically act quickly to remedy any problems that are identified by releasing software "patches" which replace or supplement the defective code. However, this approach has been found to be unsatisfactory for several reasons:

Vulnerabilities are often exploited faster than manufactures can create and disseminate patches;

Means to exploit known vulnerabilities are frequently published (on the internet) and consequently widespread attacks can be perpetrated by attackers who have little skill or knowledge themselves; and The process of applying patches is frequently delayed while patched copies of the web proxies are tested. This adds additional cost and complexity to the process and many large scale commercial systems remain "unpatched" for a considerable length of time. The UK Government agency responsible for information assurance (CESG) estimates that the majority (70% to 80%) of successful attacks on IT systems in the Public Sector could be avoided if all components were correctly patched.

Despite technical advances made in the design of such specialist components over the years, successful attacks on web proxy servers still continue and are one of the main sources of risk in large commercial information processing systems.

SUMMARY OF THE INVENTION

Viewed from a first aspect, the present invention provides a network security system for generating an alert in response to a security breach being detected in a proxy server in a data processing network, the system comprising: a distributor component comprising: an interceptor component for intercepting a request for a resource from a client device, and a duplicator component for creating a duplicate of the intercepted request and forwarding the intercepted request to a first type of proxy server and forwarding the duplicate of the intercepted request to a second type of proxy server, where in the first type of proxy server and the second type of proxy server are non-identical proxy server types; a comparator component comprising: an interceptor component for intercepting the output from the first type of proxy server and the second type of proxy server; a comparing component for comparing the output of the first type of proxy server to the output of the second type of proxy server; a determining component determining whether the output of the first type of proxy server and the output of the second type of proxy server differ, in response to comparing the outputs, and an alert generator component for generating an alert, in response to determining a difference in the outputs.

Preferably, the present invention provides a system further comprising an output blocker of the comparator component detecting that an alert has been generated and blocking the output from one or both of the first type of proxy server and the second type of proxy server.

Preferably, the present invention provides a system further comprising the determiner component determining that the output from the first type of proxy server and the second type of proxy server do not differ and a routing component for routing the output from one of the first type of proxy server or the second type of proxy server to a server for fetching the requested resource.

Preferably, the present invention provides a system further comprising the determiner component detecting an action to be performed in each of the outputs and further determining that one or both of the actions to be performed are different actions.

Preferably, the present invention provides a system further comprising the determiner component determining that one of the actions to be performed will cause a processing error in one or both of the first type and second type of web proxy servers or the server.

Preferably, the present invention provides a system further comprising the determiner component determining that the processing error is a security breach.

Viewed from a second aspect, the present invention provides network security system for generating an alert in response to a security breach being detected in a proxy server in a data processing network, the system comprising: a distributor component comprising: an interceptor component for intercepting a requested resource from a server; and a duplicator component for creating a duplicate of the intercepted requested resource and forwarding the intercepted requested resource to a first type of proxy server and forwarding the duplicate of the intercepted requested resource to a second type of proxy server, where in the first type of proxy server and the second type of proxy server are non-identical proxy servers; a comparator component comprising: an intercepting component for intercepting the output from the first type of proxy server and the second type of proxy server; a comparing component for comparing the output of the first type of proxy server to the output of the second type of proxy server; a determining component for determining whether the output of the first type of proxy server and the output of the second type of proxy server differ, in response to comparing the outputs, and an alert generator component for generating an alert, in response to determining a difference in the outputs.

Preferably, the present invention provides a system further comprising an output blocker of the comparator component detecting that an alert has been generated and blocking the output from one or both of the first type of proxy server and the second type of proxy server.

Preferably, the present invention provides a system further comprising the determiner component determining that the output from the first type of proxy server and the second type of proxy server do not differ and routing the output from one of the first type of proxy server or the second type of proxy server to the client device.

Preferably, the present invention provides a system further comprising the determiner component detecting an action to be performed in each of the outputs and further determining that one or both of the actions to be performed are different actions.

Preferably, the present invention provides a system further comprising the determiner component determining that one of the actions to be performed will cause a processing error in one or both of the first type and second type of web proxy servers or the client device.

Preferably, the present invention provides a system further comprising the determiner component determining that the processing error is a security breach.

Viewed from a third aspect, the present invention provides a method for generating an alert in response to a security breach being detected in a proxy server in a data processing network, the method comprising: intercepting a request for a resource from a client device; creating a duplicate of the intercepted request and forwarding the intercepted request to a first type of proxy server and forwarding the duplicate of the intercepted request to a second type of proxy server, where in the first type of proxy server and the second type of proxy server are non-identical proxy server types; intercepting the output from the first type of proxy server and the second type of proxy server; comparing the output of the first type of proxy server to the output of the second type of proxy server; determining whether the output of the first type of proxy server and the output of the second type of proxy server differ, in response to comparing the outputs, and generating an alert, in response to determining a difference in the outputs.

Viewed from a fourth aspect, the present invention provides a method for generating an alert in response to a security breach being detected in a proxy sever of a data processing network, the system comprising: intercepting a requested resource from a server; and creating a duplicate of the intercepted requested resource and forwarding the intercepted requested resource to a first type of proxy server and forwarding the duplicate of the intercepted requested resource to a second type of proxy server, where in the first type of proxy server and the second type of proxy server are non-identical proxy servers; intercepting the output from the first type of proxy server and the second type of proxy server; comparing the output of the first type of proxy server to the output of the second type of proxy server; determining whether the output of the first type of proxy server and the output of the second type of proxy server differ, in response to comparing the outputs, and generating an alert, in response to determining a difference in the outputs.

Viewed from a fifth aspect, the present invention provides a computer program comprising computer program code to, when loaded into a computer system and executed, perform all the steps of the method as described above.

BRIEF DESCRIPTION OF THE DRAWINGS

A preferred embodiment of the present invention will now be described by way of example only, with reference to the accompanying drawings in which:

FIGS. 5a and 5b are block diagrams illustrating the sub components of the comparator and the distributor component of FIGS. 3 and 4;

FIG. 6 is a flow chart illustrating a process flow of an HTTP request through a distributor component and a comparator component in accordance with a preferred embodiment of the present invention;

FIG. 7 is a flow chart illustrating a process flow of a fetched request through a distributor component and comparator component in accordance with a preferred embodiment of the present invention.

DETAILED DESCRIPTION OF THE INVENTION

Aspects of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
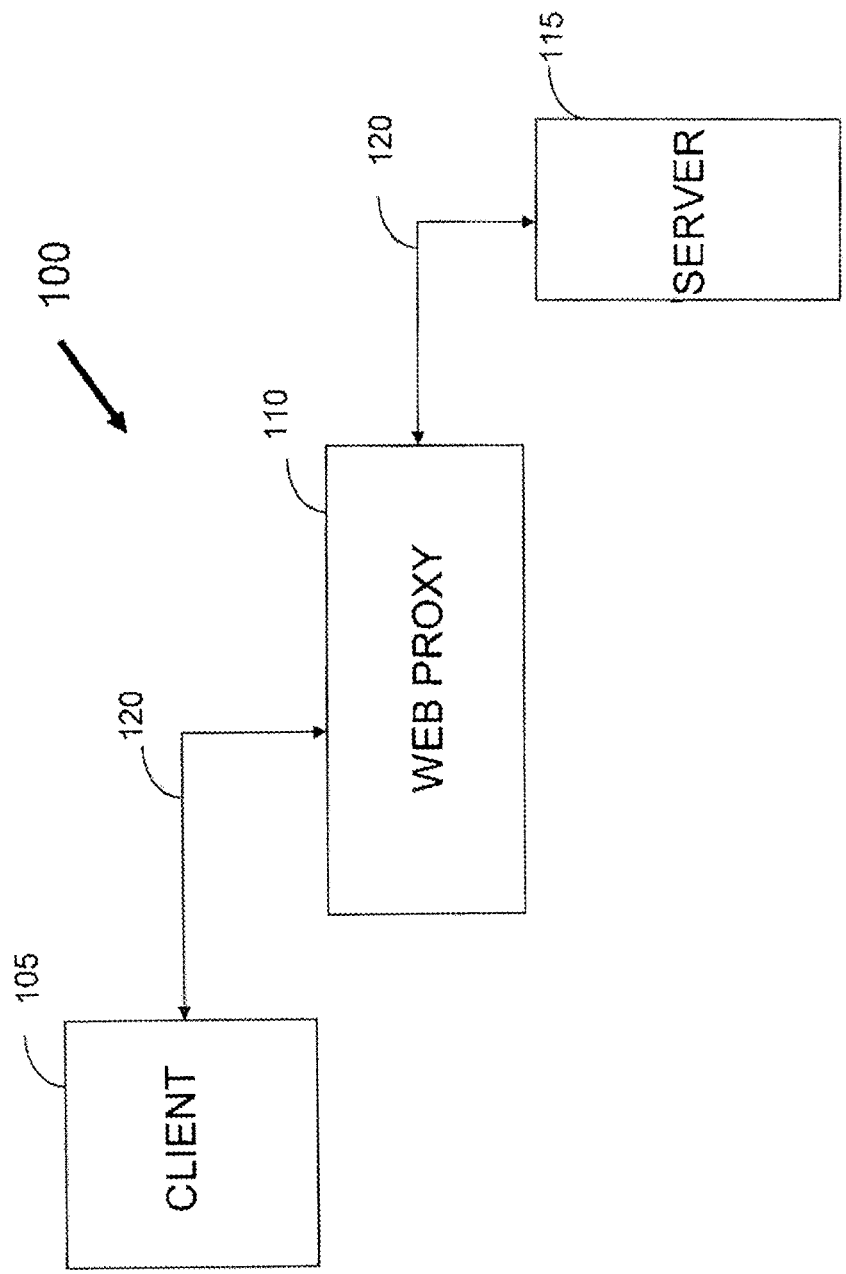
FIG. 1 is a block diagram illustrating a network security system in which the present invention may be implemented in accordance with preferred embodiment of the present invention.

Referring to FIG. 1, a simplified example of a known networked security system 100 in which a preferred embodiment of the present invention may be implemented, is shown. The network security system, of FIG. 1, comprises a client device 105, a server 115, a network 120 and a web proxy server 110. The present invention implements a method, computer system and computer program product for security processing of a request for a resource in the networked security system.

Examples of client devices 105 include, but are not limited to, personal computer systems, thin clients, handheld or laptop devices, mobile devices, set top boxes, programmable consumer electronics, network PCs, minicomputer systems etc.

Client devices 105 send requests for resources, across a network 120, using a web browser or other type of software which is suitable for sending and receiving requests for resources across the network 120.

An example of a network 120 is the internet, but any other type of network 120 in which a first device sends a request/communication for resources to a second device may be suitable.

The client device 105, typically, submits a Hyper Text Transfer Protocol (HTTP) request message to a server. The HTTP request message typically comprises a request for a resource. A resource is defined as a chunk of information or data that can be identified by a URL. A common type of resource is a file, but a resource may also be a dynamically generated query result, the output of a CGI script, a document, an image or a music file etc.

A Server 115 receives the HTTP request message and either sends the requested resource back to the client device 105 or sends the request on to another server 115 that can satisfy the client request. The requested resource is sent back in the form of a response message which contains additional information such as status information, length of message etc. The server 115 can be any type of server 115 (e.g., a web server) that is capable of storing and satisfying requests from client devices 115.

A web proxy server 110 intercepts requests for resources from the client 105 to the server 115 and vice versa when the server 115 fetches the resource for sending back to the client device 105 (reverse proxy mode). Typically, a client device 105 sends a request to a server 115 requesting a resource, such as a file, connection, web page or other type of resource from one or more servers 115. The request is intercepted by the web proxy server 110 and the web proxy server 110 evaluates the received request before fetching the requested resources from one or more severs 115.

A web proxy server 110 can perform many different types of functions. Some of the main tasks performed by a web proxy server 110 are:
Providing security functions, such as keeping the IP address of client machines anonymous,
Caching of resources
Scanning outbound and inbound resources for viruses
However, a person skilled in the art will realize that there are many other types of functions that a web proxy server can perform and the above mentioned functions are merely for illustration purposes and are not intended to limit the scope of protection.

A simplified example of process flow from client 105 to web proxy server 110 to a server 115 is given below:
Employee A launches a web browser on a client device 105 and types in a URL.
The resource is routed to a web proxy server 110 and the web proxy server 110 checks the IP address of the request against administrator defined access control.
If it is determined that the IP address is not forbidden the web proxy server 110 executes the request by sending a request message to the server 115 storing the resource.
The web proxy server 115 receives the requested resource and stores a copy of the resource in its cache.
The proxy server transmits the requested resource to the requesting client device 105.

Figure 2:
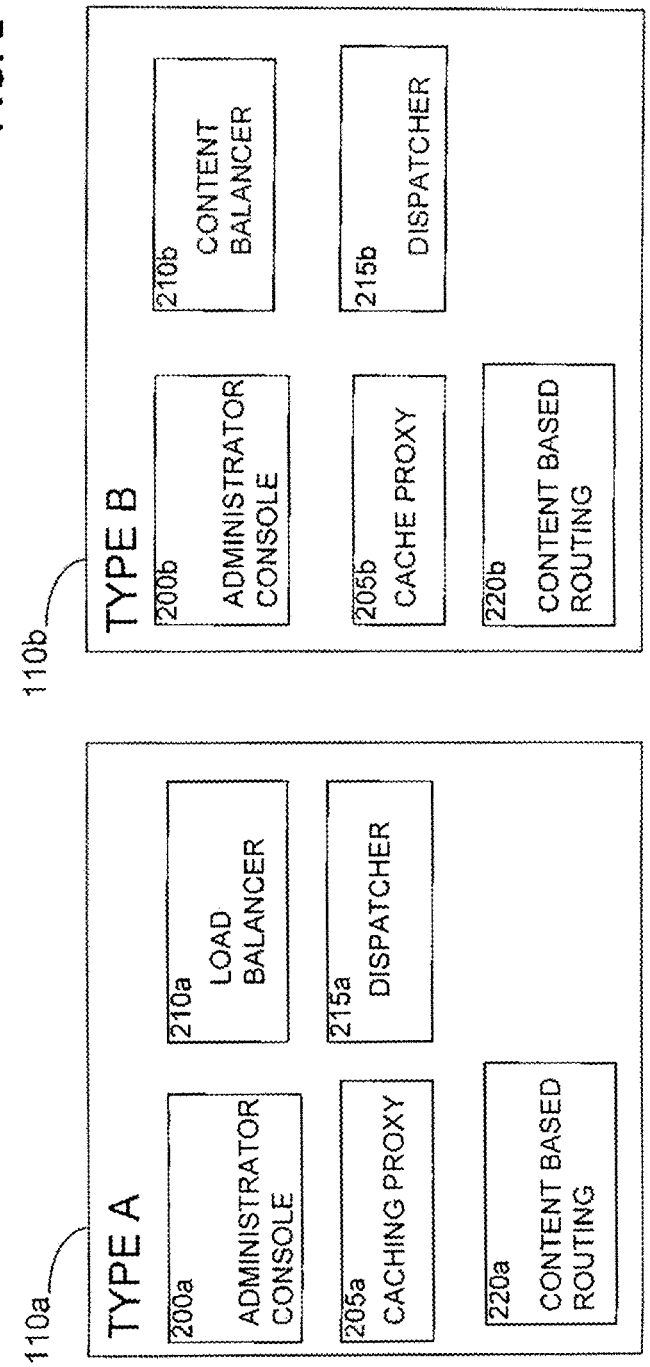
FIG. 2 is a block diagram illustrating the components of a proxy server as is known in the art.

Web proxy server 110 in FIG. 1 is embodied in web proxy server 110a, 110b in FIG. 2. Typical components of a web proxy server 110a, 110b are illustrated in FIG. 2 and include an administrator console 200a, 200b, a load balancer 210a, 210b, a caching proxy 205a, 205b, a dispatcher component 215a, 215b and a content routing component 220a, 220b, respectively. A person skilled in the art will realize that other sub components can be integrated within or interface to the web proxy server 110a, 110b without departing from the scope of protection.

The administrator console 200a, 200b provides an interface for an administrator to configure, maintain and control the web proxy server 110a, 110b and its sub components.

A caching proxy 205a, 205b is deployed for preventing download of the same content multiple times. Either passive caching or active caching is deployed. The caching proxy 205a, 205b reduces bandwidth use and improves a web site's speed and reliability by providing a point-of-presence node for one or more back-end content servers 115. The caching proxy 205a, 205b can cache and serve static content and content dynamically generated by, for example IBM's WebSphere® Application Server.

The caching proxy 205a, 205b may be configured in the role of a reverse proxy server 110 or a forward proxy server 110a, 110b, providing either a point-of-presence for an external network, such as the internet 120, or an internal network (not illustrated).

The caching proxy 205a, 205b intercepts data requests from the client 105, retrieves the requested information from the server(s) 115, and delivers that content back to the client 105. Most commonly, the requests are for documents stored on servers and delivered using the Hypertext Transfer Protocol (HTTP). However, a person skilled in the art will realize that a proxy server can be configured to handle other protocols, such as File Transfer Protocol (FTP) and Gopher etc.

The caching proxy 205a, 205b stores cacheable content in a local cache before delivering it to the requesting client 105. Examples of cacheable content may include static Web pages and JavaServer Pages files that may comprise dynamically generated, but infrequently changing, information. Java® and all Java-based trademarks and logos are trademarks or registered trademarks of Oracle and/or its affiliates. Caching enables the proxy server 110a, 110b to satisfy subsequent requests for the same content by delivering it directly from the local cache, which is much quicker than retrieving it again from the content host.

A load balancer 210a, 210b creates edge-of-network systems that direct network traffic flow, reducing congestion and balancing the load on various other services and systems. Load balancer 210a, 210b provides site selection, workload management, session affinity, and transparent failover.

Load balancer 210a, 210b intercepts data requests from clients 105 and forwards each request to the server 115 that is currently able to fulfill the request. In other words, it balances the load of incoming requests among a defined set of servers 115 that service the same type of requests.

A content based routing component 220a, 220b together with the caching proxy server 205a, 205b allow HTTP and HTTPS requests to be distributed based on URLs or other administrator-determined characteristics, eliminating the need to store identical content on all servers 115.

Each web proxy server 110a, 110b may comprise a combination of the above components. However, each of the above components may operate in a different manner. This is akin to a car—wherein a car comprises a body, wheels, an engine, a steering wheel and a gear lever etc. Different car manufactures all produce cars with the aforementioned specification but each of the parts are designed and manufactured in a unique manner that enables car manufactures to distinguish their cars from one another, for example, car A is more fuel efficient than car B based on the aerodynamics of the chassis etc. Therefore, if web proxy servers 110a, 110b are designed/manufactures by different vendors ('Type A' web proxy server and 'Type B' web proxy server), typically 'Type A' and 'Type B' web proxy servers may behave differently in response to a given type of security attack. For example, the vendor of 'Type A' web proxy server may have released a 'security patch' to fix a security vulnerability of 'Type A'. However, the vendor of 'Type B' web proxy server may have not released a 'security patch' and therefore the vulnerability still exists in 'Type B' web proxy server. Generating a security patch can take many days and leave the web proxy server 110a, 110b and the entire network 100 vulnerable to security attacks.

In order to protect the web proxy server 110a, 110b and make the patching process easier and more reliable and with reference to FIGS. 3, 4, 5a, and 5b, a distributor component 300 and a comparator component 305 are incorporated into the network security system 100, in accordance with a preferred embodiment of the present invention. The distributor component 300 intercepts requests for resource from clients 105 or intercepts the requested resources from servers 115 as these requests are on route to the web proxy server 110a, 110b. In a preferred embodiment at least two non-identical web proxy servers 110a, 110b are deployed. The term 'non-identical' is used throughout this specification to mean different types of web proxy server i.e. 'not the same' or not 'identical'. This can mean web proxy servers 110a, 110b from different manufactures, different vendors, or different versions of software residing on the server 115.

The distributor 300 routes the intercepted request to at least two non-identical web proxy severs 110a, 110b and the web proxy servers 110a, 110b continue to process the received requests in the normal manner.

The comparator component 305 analyses the output from the two non-identical web proxy servers 110a, 110b. The comparator component 300 and the distributor component 305 interact and communicate with clients 105, servers 115 and web proxy servers 110 to enhance network security and thwart unwanted security attacks.

Figure 3:
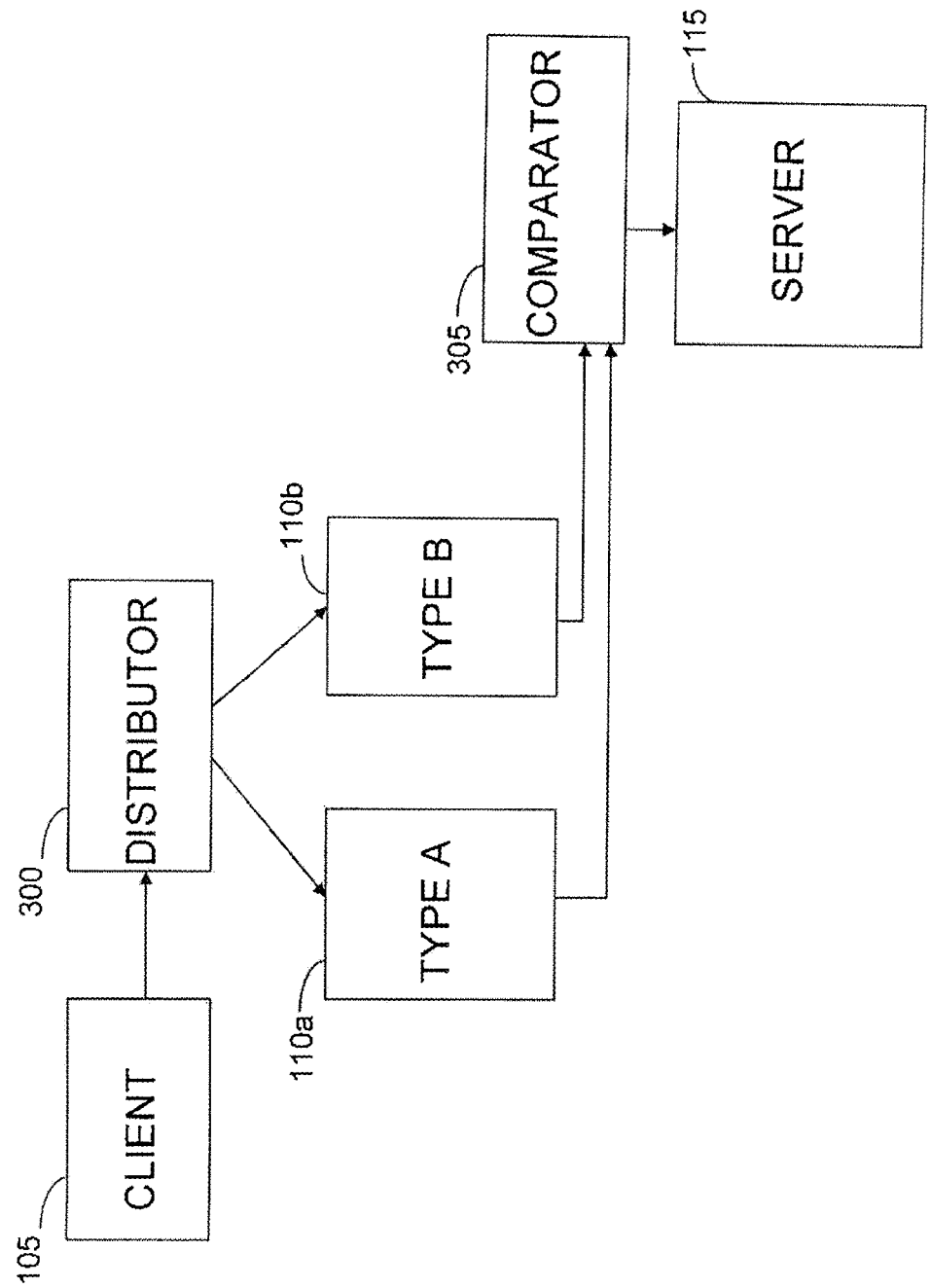
FIG. 3 is a block diagram illustrating a process flow of a request for resources from a plurality of client devices to a distributor component and a comparator component in accordance with a preferred embodiment of the present invention.

In an embodiment in FIG. 3, for incoming message i.e. messages being sent from the client 105 to the web proxy server 110a, 110b, a distributor component 300 is introduced into the network security system 100 'upstream' of the web proxy servers 110a, 110b. By 'upstream', it is meant that the distributor component 300 is located in the network 100, between one or more requesting clients 105 and at least two non-identical web proxy servers 110a, 110b.

In an embodiment in FIG. 3, for incoming message i.e. messages being sent from the client 105 to the web proxy server 110a, 110b, a comparator component 305 is introduced into the network security system 100 'downstream' of the web proxy server 110a, 110b. By 'downstream', it is meant that the comparator component 305 is located in the network 100 between two or more web proxy servers 110a, 110b and one or more servers 115 which satisfy the request for resources.

Figure 4:
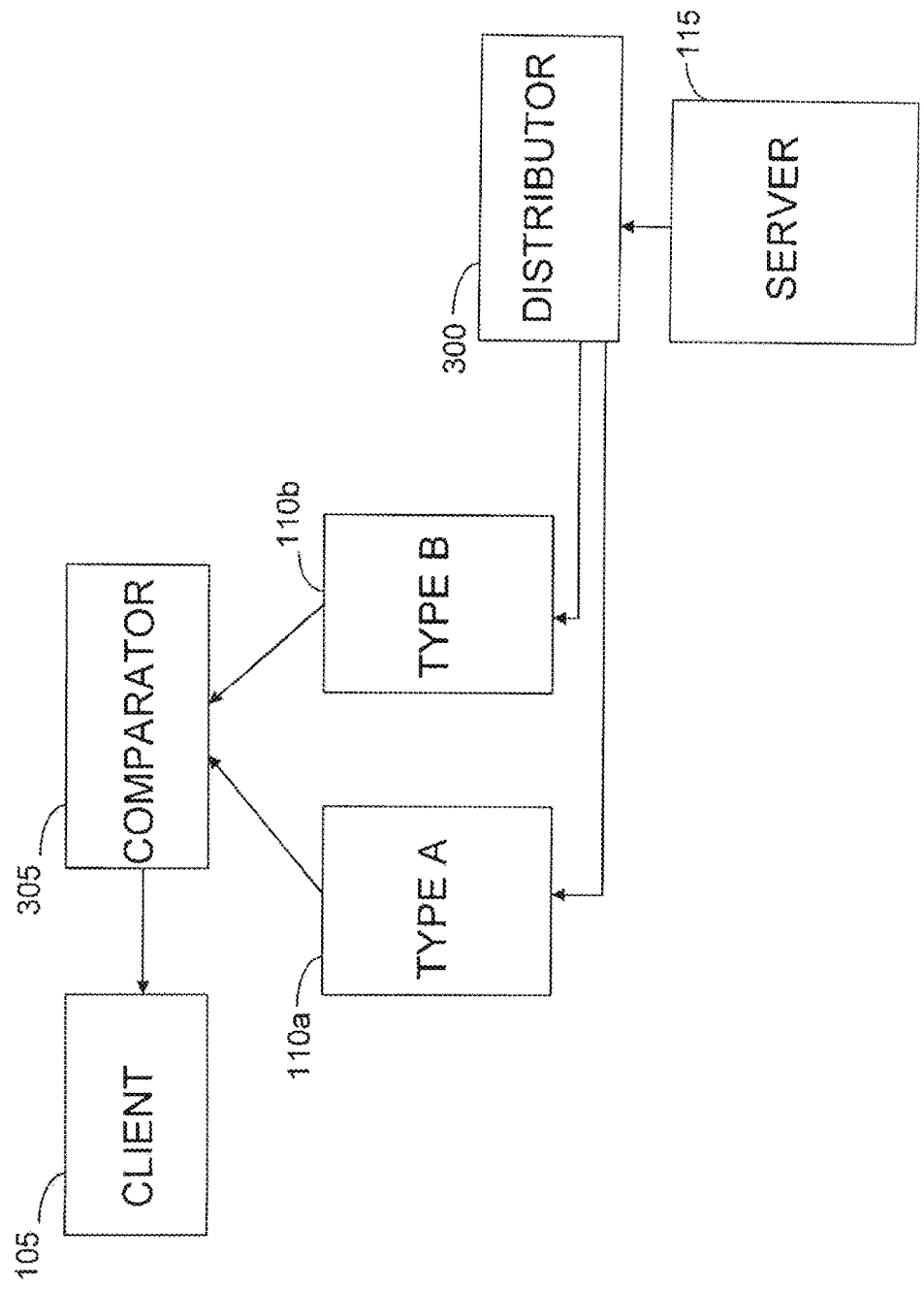
FIG. 4 is a block diagram illustrating a process flow of the request for resources of FIG. 4 being satisfied by a server and communicated to a distributor component and a comparator component in accordance with a preferred embodiment of the present invention.

In an embodiment in FIG. 4, for outgoing messages i.e. messages being sent from the server 115 to at least two web proxy servers 110a, 110b, for ongoing distribution to a requesting client 105, a distributor component 300 is introduced into the network security architecture 100 'upstream' of the web proxy server 110a, 110b. By 'upstream' it is meant that the distributor component 300 receives requests from servers 115 for sending to two or more web proxy servers 110a, 110b.

In an embodiment in FIG. 4, for outgoing messages i.e. messages being sent from the server 115 to at least two web proxy servers 110a, 110b, a comparator component 305 is introduced into the network security architecture 'downstream' of the web proxy server 110a, 110b. By 'downstream', it is meant that the comparator component 305 is located in the network 120 between two or more web proxy servers 110a, 110b and one or more requesting client devices 105.

The comparator 305 and distributor 300 may be separate components residing on the same server, or alternatively, the separate components may reside on separate servers, in the same or geographically dispersed area. Alternatively, the comparator 305 and the distributor 300 may be implemented as one software component and residing on the same server i.e. the distributor 300 intercepting requests from clients 105 and servers 115 and the comparator 305 intercepting outputs from the non-identical web proxy servers 110a, 110b. A person skilled in the art will realise that other types of arrangements are possible without departing from the scope of the invention.

With reference to FIG. 5a and FIG. 6, the distributor component 300 comprises a number of sub components that interface and interact with each other in order to process HTTP requests from requesting client devices 105. The sub components comprise a interceptor component 505 for intercepting and receiving requests from requesting client devices 105, a duplicator component 510 for creating copies of the received request, a tracker component 515 for assigning a unique identifier to the copies of the received requests and a transmitter component 520 for forwarding each of the copies of the received request to the non-identical web proxy servers 'Type A' 110a and 'Type B' 110b.

In FIG. 6, the process begins with the interceptor component 505 receiving the HTTP request from the requesting client device 105 (step 600). A simplified example of a received HTTP request is shown below:
HTTP Request
GET/index.html HTTP/1.1
Host: www.IBM.com A typical attack is to make a request for a URL using standard HTTP Get or Post commands but to include sufficient data to cause the target program to store the data in memory is such a way that it overwrites the existing memory values which may be executable instructions. In this way, an attacker can modify the behaviour of a web server and potentially cause the web server to fail or to force the web server to execute instructions supplied by the attacker.

This is called a buffer overflow condition and a buffer overflow condition exists when a program attempts to put more data in a buffer than it can hold or when a program attempts to put data in a memory area outside the designated address space. In this case, a buffer is a sequential section of memory allocated to contain anything from a character string to an array of integers. Writing outside the bounds of a block of allocated memory can corrupt data, crash the program, or cause the execution of malicious code.

The basis of the vulnerability is improper data size checking. The data is represented in the URL request by a string. Improper string length checking typically takes place when wide or multi-byte character strings are mistaken for standard character strings.

The following example illustrates the C programming language source code that is frequently used to allocate buffer space to hold data. The buffer is allocated dynamically using the C routine "malloc".

The following example would be exploitable if any of the commented incorrect malloc calls were used.
Example Code

```
#include <stdio.h>
#include <strings.h>
#include <wchar.h>
int main( ) {
wchar_t wideString[ ] = L" The spazzy orange tiger jumped "\
"over the tawny jaguar.";
wchar_t *newString;
printf("Strlen( ) output: %d\nWcslen( ) output: %d\n",
strlen(wideString), wcslen(wideString));
/* The following is incorrect because it is not appropriate to find the
length of a string which has been defined as a "wide string//
newString = (wchar_t *) malloc(strlen(wideString));
*/
/* The following string is incorrect because wide characters aren't 1 byte
long //
newString = (wchar_t *) malloc(wcslen(wideString));
*/
/* correct! */
newString = (wchar_t *) malloc(wcslen(wideString) *
sizeof(wchar_t));
/* ... */
}
```

The output from the printf( ) statement would be:
Strlen( ) output: 0
Wcslen( ) output: 53
Source: https://www.owasp.org/index.php/Improper_string_length_checking available under the creative commons license.

A duplicator component 510 of the distributor component 300 creates a copy of the received HTTP request (step 605).

The tracker component 515 appends a unique identifier to the received request and the copy of the received request. The unique identifier is used for tracking the requests (original request and duplicate request) through the security network, such that, the comparator 305 can correctly recognise the received request and the duplicate request.

The transmitter component 520 transmits the received request to a 'Type A' web proxy server 110*a* and the duplicate request to a second web proxy server to 'Type B' web proxy server 110*b* (step 610). A person skilled in the art will realise that it is irrelevant which web proxy server 110*a*, 110*b* the received request or the duplicate request is sent to as long as the selected two web proxy servers 110*a*, 110*b* are not identical i.e. are of different types.

Both web proxy servers 110*a*, 110*b* receive the HTTP request for resources and proceeds to process the request. As the two web proxy servers 110*a*, 110*b* are not identical and operate in different ways the following scenario may take place.

'Type A' web proxy 110*a* proceeds to process the received request. In this example, 'Type A' web proxy server 110*a* does not correctly measure the size or type of the data that is contained within the received request and allocates memory space using one of the invalid methods in the above code snippet examples. 'Type A' web proxy server 110*a* consequently suffers a buffer overflow which allows code instructions to be overwritten by user data. The result will depend on the instructions supplied by the attacker but typically no data is forward to the rest of the network system 100 and instead control of the 'Type A' web proxy server 100 is returned to the user i.e. the user has effectively "logged in" to the 'Type A' web proxy server 110*a* as the system administrator.

'Type B' web proxy server 110*b* receives the duplicate request and proceeds to process the request. In this example 'Type B' web proxy validates the size of the data in the received URL request and allocates memory correctly.

Consequently 'Type B' web proxy server 110*b* processes the received request by:
returning an error message to the user and not forwarding any data into the rest of the system, or
truncates the user supplied data in the received request until it remaining data (i.e., data not removed from the user supplied data by the truncation) is of a valid length and only forwards the remaining data into the rest of network system 100, or
allocates sufficient memory for the data in the received request which avoids overwriting code instructions with the data in the received request.

With reference to FIG. 5*b* and FIG. 6, the comparator component 305 comprises an interceptor component 525 for intercepting the output from the web proxy servers 110*a*, 110*b* (step 615). The interceptor component 505 receives the output from 'Type A' web proxy server 110*a* (buffer overflow—data overwritten) and the output from 'Type B' web proxy server 110*b* (the correct output). In one embodiment, the output from 'Type A' web proxy server 110*a* and from 'Type B' web proxy server 110*b* includes the received request and the duplicate of the received request, respectively.

A comparing component 530 parses and compares each of the received outputs. The comparing component 530 interfaces with a determiner component 540. The determiner component 540 in combination with a database of rules 545 determines if there is a 'difference' between the two outputs (step 620). In one embodiment, the preceding 'difference' is an essential difference defined as a difference that materially affects a basic and/or novel characteristic of the present invention. If no difference is determined, a routing component 550 forwards either output (i.e., the HTTP request (received request or the duplicate of the received request)) to an appropriate server 115 for satisfying the request. If the determiner component 540 detects a difference between the output of 'Type A' and the output of 'Type B', an alert is generated (step 625), by an alert generator component 535 in order to block the transmission to the server 115 of the output from both of the web proxy servers 110a, 110b which blocks transmission to the server 115 of the received request and the duplicate of the received request (step 630).

In another embodiment, the determiner component 540 and the database 545 comprise additional logic which enables the determiner component 540 to detect an 'expected' output from a web proxy server 110a, 110b of a particular type. Thus enabling the determiner component 540 to detect which output (i.e., the expected output) from a web proxy server 110a, 110b can be forward to a server 115 and which output (i.e., the output differing from the expected output) from a web proxy server 110a, 110b should be blocked.

The comparator 305 and distributor components 300 also operate in a reverse direction (FIG. 4 and FIG. 7). Once the server 115 has satisfied the request for resources, a reply message comprising the requested resources is transmitted back over the network 120 to a distributor component 300 and its sub components 505 to 515 (step 700). The distributor component 300 proceeds to make a copy of the reply message (step 705) and appends a unique identifier to the reply message and the copy of the reply message. The received reply message and the copy of the reply message are transmitted to non-identical web proxy severs 110a, 110b for processing.

The output of the non-identical web proxy servers 110a, 110b is sent to a comparator component 305 for processing (step 710). The comparator component 305 and its sub components 525 to 560 receive the output from 'Type A' web proxy server and 'Type B' web proxy server (step 715). A comparing component 530 compares both of the outputs to each other. The comparing component 530 interfaces with a determiner component 540 (in combination with a database of rules 545) and determines if there is a 'difference' between the two outputs (step 730). If no difference is determined, the determiner component 540 sends the reply message which includes the requested resources to a router component 550 for transmitting to the requesting client 105. If the determiner component 540 detects a difference between the two outputs, an alert is generated (step 725) in order to block the execution of the output from both the web proxy servers 110a, 110b (step 730).

An alert is generated by the alert generator component 535 of the comparator component 305. The alert not only alerts the output blocker component 555 to block one or both of the outputs of the web proxy server (s) 110a, 110b because a security breach (e.g., a malicious attack) has been detected, but a classification engine 560 interacts with the alert generator component 535 to classify the type of security breach or attack such that a report can be generated detailing the action that the web proxy server 110a, 110b was going to perform and why this was determined to be a malicious attack. Types of attacks can be an SQL injection attack, security misconfiguration or a buffer overflow attack for example.

A person skilled in the art will realise that although a preferred embodiment of the invention has been described in terms of using two non-identical web proxy servers and comparing the out, more that two non-identical web proxy servers can be used without departing from the scope of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
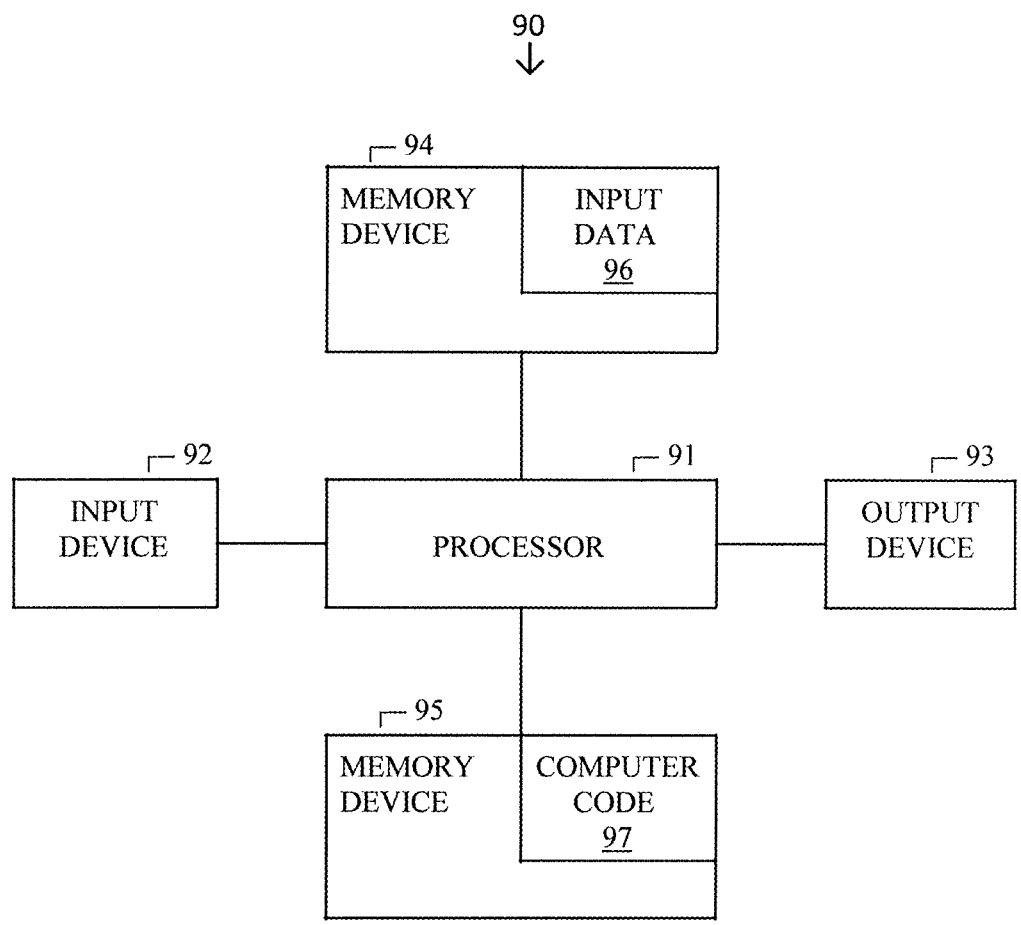
FIG. 8 illustrates a computer system used for implementing the methods of the present invention.

FIG. 8 illustrates a computer system 90 used for implementing the methods of the present invention and may comprise any computer, server, or combination thereof, described herein, and any other hardware and software components of or within the network security system of FIG. 1. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for security processing of a request for a resource in a network security system that includes a computer system containing one or more processors, said method comprising:
   receiving, by a distributor component from a client device using the one or more processors, the request for the resource;
   creating, by the distributor component using the one or more processors, a duplicate of the received request;
   after said creating the duplicate, forwarding, by the distributor component using the one or more processors: (i) the received request directly to a first proxy server and (ii) the duplicate of the received request directly to a second proxy server, wherein the first proxy server and the second proxy server are different types of proxy servers that differ in being from different manufacturers, being from different vendors, having different versions of software stored therein, or combinations thereof;
   after said forwarding, receiving, by a comparator component using the one or more processors, a first output from the first proxy server and a second output from the second proxy server, said first output and said second output including the received request and the duplicate of the received request, respectively; and
   determining, by the comparator component using the one or more processors, whether the first output and the second output differ from each other, and if not transmitting, by the comparator component using the one or more processors, the received request or the duplicate of the received request to a web server for satisfying the request, and if so generating, by the comparator component using the one or more processors, a first alarm and blocking, by the comparator component using the one or more processors, transmission to the web server of the received request and the duplicate of the received request, wherein said generating the first alarm and said blocking transmission to the web server are in response to a first security breach identified by the determining that the first output and the second output differ from each other, wherein the distributor component is located upstream of the first and second proxy servers, and wherein the comparator component is located downstream of the first and second proxy servers.

2. The method of claim 1, said method comprising:
   determining, by the comparator component using the one or more processors, that the first output and the second output do not differ from each other.

3. The method of claim 2, said method comprising:
   transmitting, by the comparator component using the one or more processors, the received request to the web server.

4. The method of claim 2, said method comprising:
   transmitting, by the comparator component using the one or more processors, the duplicate of the received request to the web server.

5. The method of claim 2, said method comprising:
   after said transmitting the received request or the duplicate of the received request to the web server, receiving, by the comparator component from the web server using the one or more processors, a reply message comprising the requested resource;
   creating, by the comparator component using the one or more processors, a copy of the reply message;
   after said creating the copy, sending, by the comparator component using the one or more processors: (i) the reply message to the first proxy server and (ii) the copy of the reply message to the second proxy server;
   after said sending the reply message and the copy of the reply message, receiving, by the distributor component using the one or more processors, a first message from the first proxy server and a second message from the second proxy server, said first message and said second message being in response to the reply message and to the copy of the reply message, respectively; and
   determining, by the distributor component using the one or more processors, whether the first message and the second message differ from each other, and if not transmitting, by the distributor component using the one or more processors, the reply message to client device, and if so generating, by the distributor component using the one or more processors, a second alarm and blocking, by the distributor component using the one or more processors, transmission of the reply message to the client device, wherein said generating the second alarm and said blocking transmission to the client device are in response to a second security breach identified by the determining that the first message and the second message differ from each other.

6. The method of claim 1, said method comprising:
   determining, by the distributor component using the one or more processors, that the first output and the second output differ from each other.

7. The method of claim 6, wherein the first alarm identifies a type of the first security breach that has been detected.

8. The method of claim 6, wherein said determining that the first output and the second output differ from each other comprises determining that there is an essential difference between the first output and the second output.

9. A computer program product, comprising one or more computer readable hardware storage devices having computer readable program code stored therein, said program code containing instructions executable by one or more processors of a computer system to implement a method for security processing of a request for a resource in a network security system that includes a computer system containing the one or more processors, said method comprising:
   receiving, by a distributor component from a client device using the one or more processors, the request for the resource;
   creating, by the distributor component using the one or more processors, a duplicate of the received request;
   after said creating the duplicate, forwarding, by the distributor component using the one or more processors: (i) the received request directly to a first proxy server and (ii) the duplicate of the received request directly to a second proxy server, wherein the first proxy server and the second proxy server are different types of proxy servers that differ in being from different manufacturers, being from different vendors, having different versions of software stored therein, or combinations thereof;
   after said forwarding, receiving, by a comparator component using the one or more processors, a first output from the first proxy server and a second output from the second proxy server, said first output and said second output including the received request and the duplicate of the received request, respectively; and determining, by the comparator component using the one or more processors, whether the first output and the second output differ from each other, and if not transmitting, by the comparator component using the one or more processors, the received request or the duplicate of the received request to a web server for satisfying the request, and if so generating, by the comparator component using the one or more processors, a first alarm and blocking, by the comparator component using the one or more processors, transmission to the web server of the received request and the duplicate of the received request, wherein said generating the first alarm and said blocking transmission to the web server are in response to a first security breach identified by the determining that the first output and the second output differ from each other, wherein the distributor component is located upstream of the first and second proxy servers, and wherein the comparator component is located downstream of the first and second proxy servers.

10. The computer program product of claim 9, said method comprising:
determining, by the comparator component using the one or more processors, that the first output and the second output do not differ from each other.

11. The computer program product of claim 10, said method comprising:
transmitting, by the comparator component using the one or more processors, the received request to the web server.

12. The computer program product of claim 10, said method comprising:
transmitting, by the comparator component using the one or more processors, the duplicate of the received request to the web server.

13. The computer program product of claim 10, said method comprising:
after said transmitting the received request or the duplicate of the received request to the web server, receiving, by the comparator component from the web server using the one or more processors, a reply message comprising the requested resource;
creating, by the comparator component using the one or more processors, a copy of the reply message;
after said creating the copy, sending, by the comparator component using the one or more processors: (i) the reply message to the first proxy server and (ii) the copy of the reply message to the second proxy server;
after said sending the reply message and the copy of the reply message, receiving, by the distributor component using the one or more processors, a first message from the first proxy server and a second message from the second proxy server, said first message and said second message being in response to the reply message and to the copy of the reply message, respectively; and
determining, by the distributor component using the one or more processors, whether the first message and the second message differ from each other, and if not transmitting, by the distributor component using the one or more processors, the reply message to client device, and if so generating, by the distributor component using the one or more processors, a second alarm and blocking, by the distributor component using the one or more processors, transmission of the reply message to the client device, wherein said generating the second alarm and said blocking transmission to the client device are in response to a second security breach identified by the determining that the first message and the second message differ from each other, wherein the distributor component is located upstream of the first and second proxy servers, and wherein the comparator component is located downstream of the first and second proxy servers.

14. The computer program product of claim 9, said method comprising:
determining, by the distributor component using the one or more processors, that the first output and the second output differ from each other.

15. A computer system, comprising one or more processors, one or more memories, and one or more computer readable hardware storage devices, said one or more hardware storage device containing program code executable by the one or more processors via the one or more memories to implement a method for security processing of a request for a resource in a network security system that includes the computer system, said method comprising:
receiving, by a distributor component from a client device using the one or more processors, the request for the resource;
creating, by the distributor component using the one or more processors, a duplicate of the received request;
after said creating the duplicate, forwarding, by the distributor component using the one or more processors: (i) the received request directly to a first proxy server and (ii) the duplicate of the received request directly to a second proxy server, wherein the first proxy server and the second proxy server are different types of proxy servers that differ in being from different manufacturers, being from different vendors, having different versions of software stored therein, or combinations thereof;
after said forwarding, receiving, by a comparator component using the one or more processors, a first output from the first proxy server and a second output from the second proxy server, said first output and said second output including the received request and the duplicate of the received request, respectively; and
determining, by the comparator component using the one or more processors, whether the first output and the second output differ from each other, and if not transmitting, by the comparator component using the one or more processors, the received request or the duplicate of the received request to a web server for satisfying the request, and if so generating, by the comparator component using the one or more processors, a first alarm and blocking, by the comparator component using the one or more processors, transmission to the web server of the received request and the duplicate of the received request, wherein said generating the first alarm and said blocking transmission to the web server are in response to a first security breach identified by the determining that the first output and the second output differ from each other.

16. The computer system of claim 15, said method comprising:
determining, by the comparator component using the one or more processors, that the first output and the second output do not differ from each other.

17. The computer system of claim 16, said method comprising:
transmitting, by the comparator component using the one or more processors, the received request to the web server.

18. The computer system of claim 16, said method comprising:
- transmitting, by the comparator component using the one or more processors, the duplicate of the received request to the web server.

19. The computer system of claim 16, said method comprising:
- after said transmitting the received request or the duplicate of the received request to the web server, receiving, by the comparator component from the web server using the one or more processors, a reply message comprising the requested resource;
- creating, by the comparator component using the one or more processors, a copy of the reply message;
- after said creating the copy, sending, by the comparator component using the one or more processors: (i) the reply message to the first proxy server and (ii) the copy of the reply message to the second proxy server;
- after said sending the reply message and the copy of the reply message, receiving, by the distributor component using the one or more processors, a first message from the first proxy server and a second message from the second proxy server, said first message and said second message being in response to the reply message and to the copy of the reply message, respectively; and
- determining, by the distributor component using the one or more processors, whether the first message and the second message differ from each other, and if not transmitting, by the distributor component using the one or more processors, the reply message to client device, and if so generating, by the distributor component using the one or more processors, a second alarm and blocking, by the distributor component using the one or more processors, transmission of the reply message to the client device, wherein said generating the second alarm and said blocking transmission to the client device are in response to a second security breach identified by the determining that the first message and the second message differ from each other.

20. The computer system of claim 15, said method comprising:
- determining, by the distributor component using the one or more processors, that the first output and the second output differ from each other.

\* \* \* \* \*